United States Patent
Frampton et al.

(10) Patent No.: US 7,080,813 B1
(45) Date of Patent: Jul. 25, 2006

(54) ASSEMBLY FOR SUSPENDING AN OBJECT FROM A SLOPED SURFACE

(75) Inventors: Thomas C. Frampton, Zionsville, IN (US); Peter S. Jenkins, Avon, IN (US)

(73) Assignee: Fanimation, Inc., Zionsville, IN (US)

( * ) Notice: Subject to any disclaimer, the term of this patent is extended or adjusted under 35 U.S.C. 154(b) by 0 days.

(21) Appl. No.: 10/693,434

(22) Filed: Oct. 24, 2003

(51) Int. Cl.
*B42F 13/00* (2006.01)

(52) U.S. Cl. .................. 248/343; 248/342; 416/244 R

(58) Field of Classification Search ........... 248/343, 248/288.31, 288.51, 317, 342, 344, 345; 403/348, 350, 170; 416/244 R, 210 R, 5
See application file for complete search history.

(56) References Cited

U.S. PATENT DOCUMENTS

| | | | | |
|---|---|---|---|---|
| 2,749,074 | A | * | 6/1956 | Bodian .................. 248/344 |
| 2,815,918 | A | | 12/1957 | Wolar |
| 2,882,005 | A | * | 4/1959 | Ramsing .................. 248/343 |
| 4,398,668 | A | * | 8/1983 | Jette .................. 239/414 |
| 4,591,286 | A | * | 5/1986 | Galan Inchaurbe ......... 403/170 |
| 4,626,123 | A | * | 12/1986 | Brown .................. 403/141 |
| 4,634,345 | A | * | 1/1987 | Stanek et al. ........... 416/244 R |
| 4,697,777 | A | * | 10/1987 | Yang .................. 248/343 |
| 4,754,947 | A | | 7/1988 | Propp |
| 5,090,654 | A | * | 2/1992 | Ridings et al. ............. 248/343 |
| 5,613,832 | A | * | 3/1997 | Su .................. 416/244 R |
| 5,725,190 | A | | 3/1998 | Cuthbertson et al. |
| 5,813,435 | A | * | 9/1998 | Knapp .................. 137/625.41 |
| 5,851,107 | A | * | 12/1998 | Wang .................. 416/244 R |
| 5,947,436 | A | * | 9/1999 | Bucher et al. ............. 248/345 |
| 6,042,072 | A | * | 3/2000 | Chi-Nan .................. 248/343 |
| 6,200,095 | B1 | * | 3/2001 | Bucher et al. .............. 416/5 |
| 6,203,279 | B1 | | 3/2001 | Moody et al. |
| 6,280,145 | B1 | * | 8/2001 | Liu .................. 416/244 R |
| 6,761,540 | B1 | * | 7/2004 | Tseng .................. 416/244 R |
| 2003/0213883 | A1 | * | 11/2003 | Fu-Liang .................. 248/343 |

* cited by examiner

*Primary Examiner*—Anita M. King
(74) *Attorney, Agent, or Firm*—Maginot, Moore & Beck

(57) ABSTRACT

An assembly for suspending an object from a surface includes a down rod having a width, an upper end, and a lower end for engaging the object. A ball member is also provided. The ball member has a generally hemispherical body with a longitudinal axis and a bore extending through the body obliquely relative to the longitudinal axis. The ball member also has a diameter wherein the ball member is connected to the upper end of the down rod. A hanger bracket is also provided. The hanger bracket has an upper end for being mounted to the surface and a bottom end that defines a socket. The socket includes an opening through it that is smaller than the diameter of the ball member. The socket's opening defines a radius so that the ball is received in the socket such that the down rod extends through the opening.

30 Claims, 5 Drawing Sheets

ASSEMBLY FOR SUSPENDING AN OBJECT FROM A SLOPED SURFACE

BACKGROUND OF THE INVENTION

This invention relates generally to an assembly for suspending an object from a surface and, more particularly, to a ball and socket assembly and method for suspending an object, such as a ceiling fan, from a sloped ceiling.

Devices for suspending objects, such as ceiling fans and light fixtures, from ceilings typically include a hanger bracket attached to the surface that engages the object to be hung. The difficulties of mounting such objects from gently sloped ceilings have been improved through the use of hanger brackets that have a socket that engages a ball member on the top of a down rod to form a ball and socket joint. The lower end of the down rod, in turn, engages the object to be hung. This mounting scheme allows the down rod to pivot in the hanger bracket so that the object may hang downward despite the plain of the ceiling being slightly sloped.

A common configuration for such devices is to have a gap in the socket of an appropriate width such that the down rod can pass through the gap when mounting the ball member in the socket. Other hanger ball systems have no gap in the socket. With those systems, the down rod passes through from the top of the socket, and the rod is then attached to the fixture below. The configuration with the gap is typically used because it allows for convenient mounting of objects for installation purposes and unmounting of objects for purposes such as servicing the objects. But with this configuration, the greater the angle of the ceiling, the more likely the ball member is to pivot in the hanger bracket permitting the down rod to pass through the gap and the object to fall. Another problem is that as the ball member pivots in the socket, the down rod comes to rest against the bracket prohibiting the bracket and ball member assembly from being used on ceilings having a slope greater than about 30 degrees The present invention addresses these shortcomings in the prior art.

SUMMARY OF THE INVENTION

The present invention provides a ball member for use with an assembly of the type used for suspending an object from a surface. The assemblies to which the invention is concerned typically include (i) a down rod with an outer diameter, un upper end, and a lower end for engaging the object; (ii) a ball member with a diameter so that the ball member is connected to the upper end of the down rod; (iii) a hanger bracket that includes an upper end for mounting to the surface and a bottom end so as to define a socket that has an opening through it that is smaller than the diameter of the ball member. The opening also has a radius so that the ball is received in the socket such that the down rod extends through the opening; and, (iv) a gap in the socket that is wider than the width of the down rod and narrower than the diameter of the ball member and that is positioned so that the down rod can pass through the gap when mounting the ball member in the socket. In one aspect, the ball member of the invention includes a generally hemispherical body with a longitudinal axis. A bore extends through the body obliquely relative to the longitudinal axis of the body.

In another aspect, an assembly for suspending an object from a surface is provided. The assembly includes a down rod with a width, an upper end, and a lower end for engaging the object. A ball member is included that has a generally hemispherical body with a longitudinal axis, a bore extends through the body obliquely relative to the longitudinal axis of the body. The ball member also has a diameter so that the ball member is connected to the upper end of the down rod. A hanger bracket is also included. The hanger bracket has an upper end for mounting to the surface and a bottom end, which has a socket with an opening through it that is smaller than the diameter of the ball member. The opening defines a radius such that the ball is received in the socket and the down rod extends through the opening.

In another aspect of the invention, a hanger bracket for use with an assembly for suspending an object from a surface is provided. The hanger bracket has a top for mounting to the surface. The hanger bracket also has a bottom socket for receiving a ball member. The top of the hanger bracket and the bottom socket are connected by a wall. The wall has at least one reinforcing member formed in it.

In still another aspect, a ceiling fan is provided that includes an assembly for mounting to a ceiling, a motor, a rotating member and an upper stationary member. A down rod is included that has a width, an upper end, and a lower end for engaging the upper stationary member. There is a ball member included with a generally hemispherical body that has a longitudinal axis. A bore extends through the body obliquely relative to the longitudinal axis of the body. The ball member includes a diameter such that the ball member is connected to the upper end of the down rod. A hanger bracket is included that has an upper end for mounting to the ceiling and a bottom end that forms a socket that has an opening through it that is smaller than the diameter of the ball member. The opening forms a radius so that the ball is received in the socket such that the down rod extends through the opening.

The invention also contemplates a method for suspending an object from a surface. The method includes the steps of: (i) mounting an upper end of a hanger bracket to the surface. The hanger bracket includes a bottom end that defines a socket; (ii) providing a generally hemispherically shaped ball member with a longitudinal axis. A bore extends through the body of the ball member obliquely relative to the longitudinal axis of the body; (iii) providing a down rod with an upper end and a lower end. The ball member is connected to the upper end of the down rod; (iv) passing the down rod through a gap in the socket and into a circular opening formed by the socket. The gap and the opening are each wider than the width of the down rod and narrower than the diameter of the ball member; (v) lowering the ball member into the socket so that the down rod extends through the opening; and, (vi) connecting the lower end of the down rod to the object.

One object of the present invention is to provide an improved ball socket assembly for suspending an object from a sloped ceiling. Related objects and advantages of the present invention will be apparent from the following description.

DESCRIPTION OF THE PREFERRED EMBODIMENTS

Figure 1:
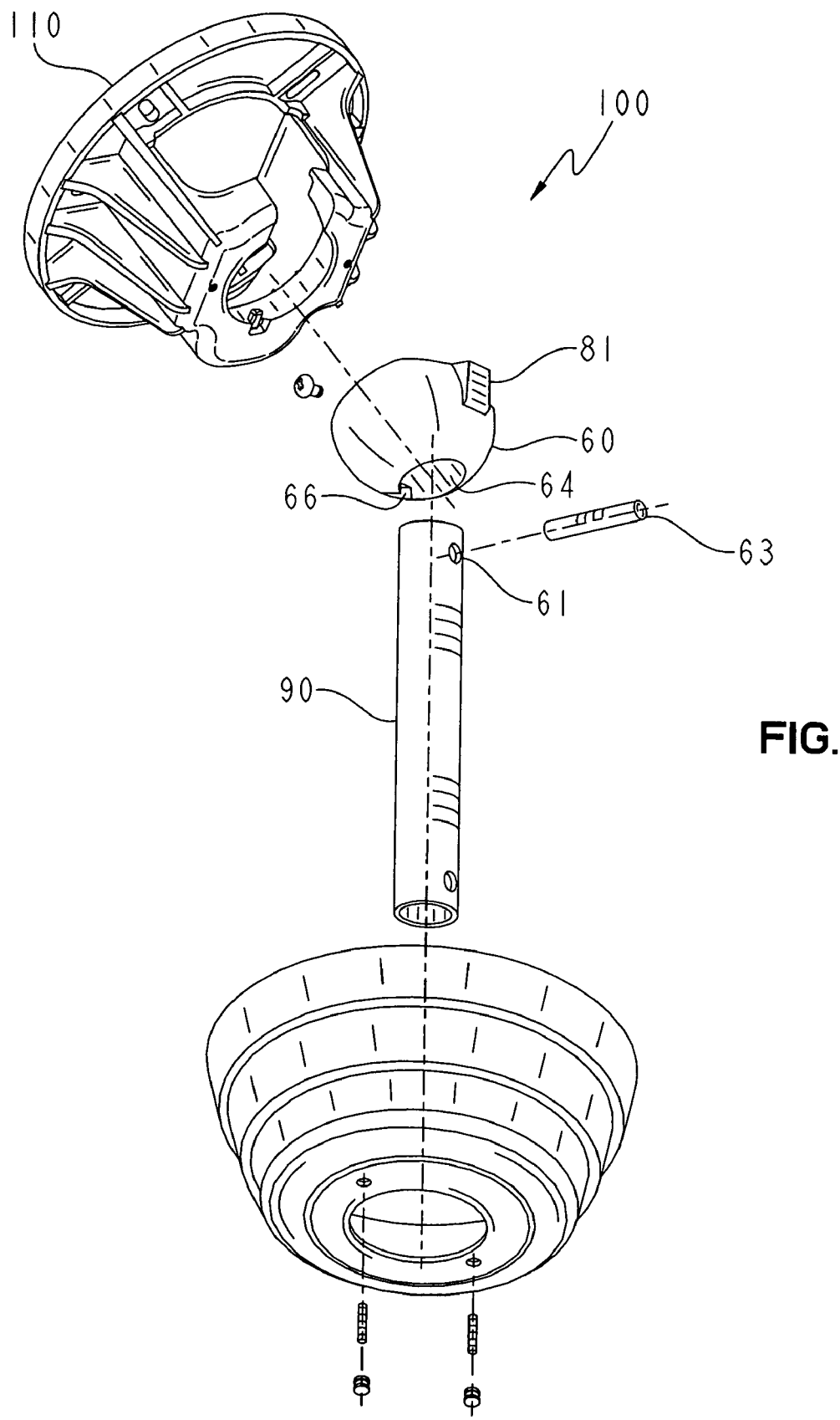
FIG. 1 is a perspective view showing the bracket, ball member and down rod disassembled.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 3:
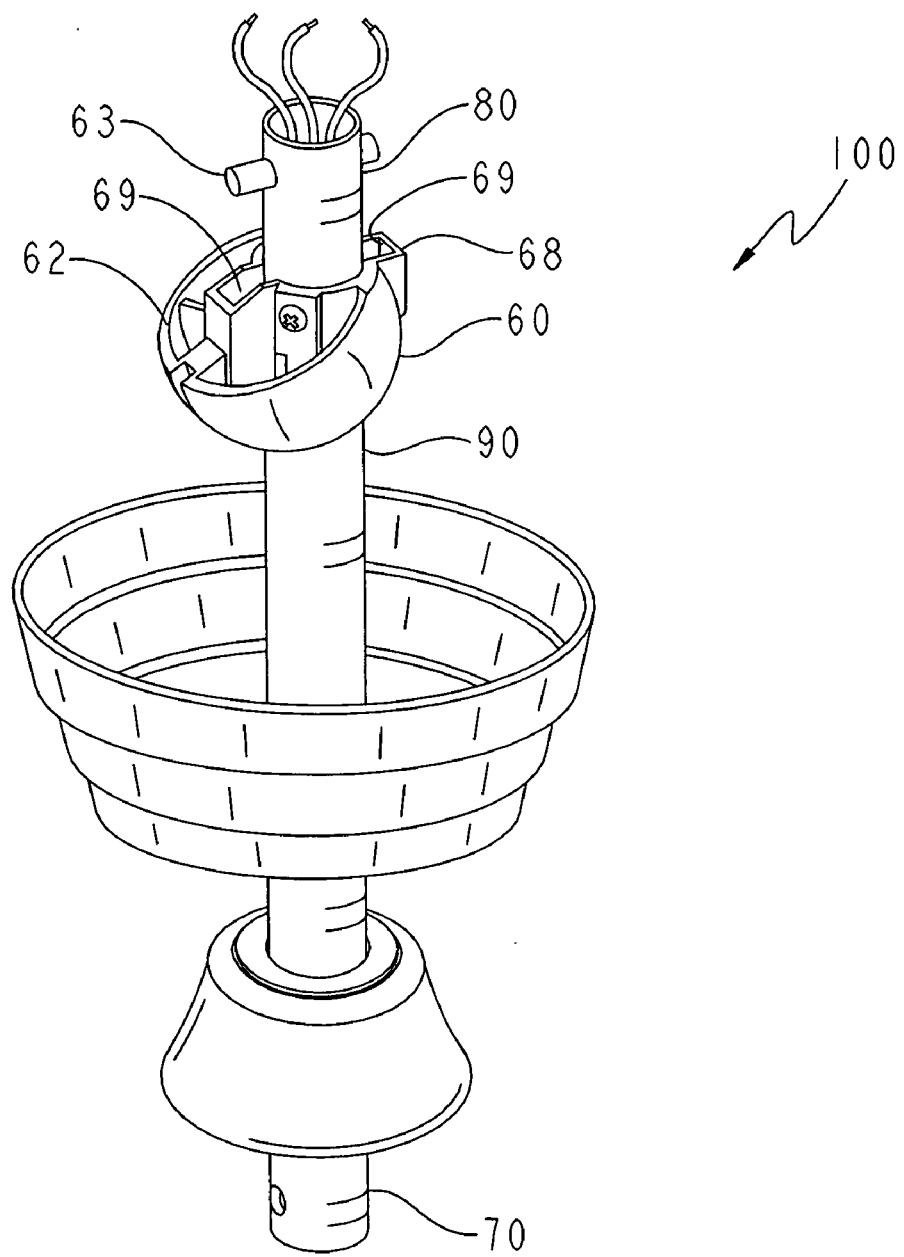
FIG. 3 is a view of an embodiment of how the down rod is connected with the ball member in accordance with the present invention.
Figure 4:
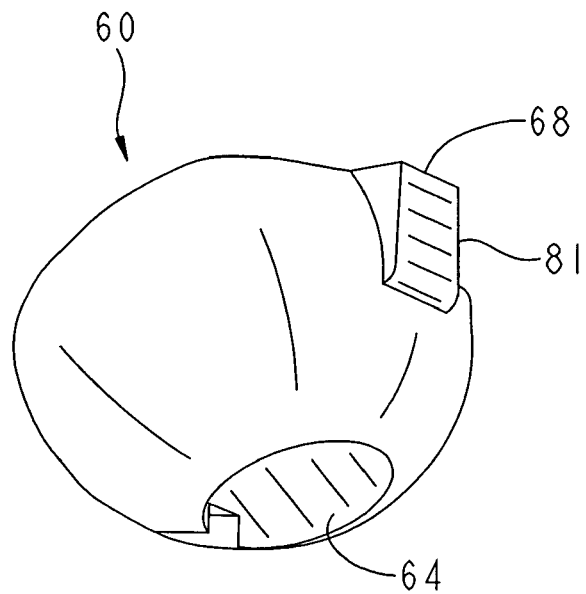
FIG. 4 is a perspective view of an embodiment of the ball member.

With reference to the Figures, FIG. 1 schematically illustrates one particular embodiment of the invention, which is an assembly 100 for suspending an object from a sloped surface. A down rod 90 having a width is provided that also has a ball member 60 on its upper end and a lower end 70 for engaging the object to be suspended. The object can be any object, including a ceiling fan or light fixture. As shown in FIG. 1, the ball member 60 is connected to the down rod 90 by means of a hanger pin 63 that passes through holes 61 in the upper end of the down rod 90, which are positioned to receive pin 63. In one embodiment, pin 63 passes through holes 61 once down rod 90 has been inserted through the bore 64 of ball member 60, as shown in FIG. 3. As a result, pin 63 is contained inside receptacle 68 within ball member 60. A portion of receptacle 68, receptacle member 81, protrudes outwardly from the surface of ball member 60. Ball member 60, however, may be connected in any manner to down rod 90, including through the use of screws, nuts and bolts, or adhesives. Additionally, down rod 90 can be molded or shaped to include an integral ball member 60 component. The term "connected to" in the context of connecting the ball member 60 to the down rod 90 is intended to encompass any of the above means of connecting ball member 60 to the down rod 90, including the integrally molded configuration.

Figure 5:
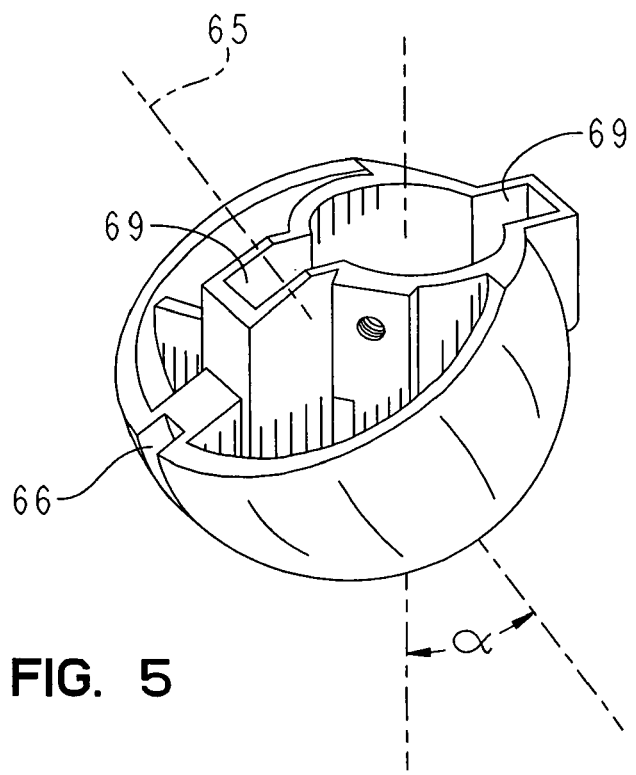
FIG. 5 is another perspective view of an embodiment of the ball member showing the interior of the ball member and the receptacle.
Figure 6:
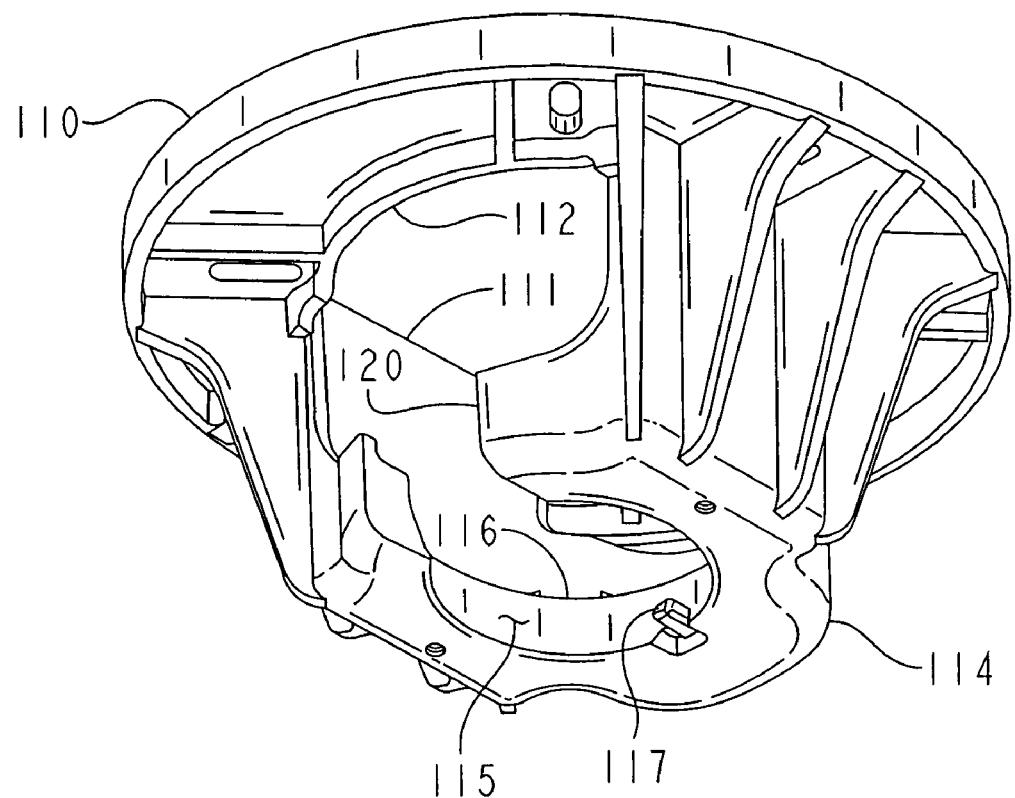
FIG. 6 is a perspective view of an embodiment of the hanger bracket.

In a preferred embodiment, ball member 60 includes hemispherical body 62 having longitudinal axis 65. Channel 66 is formed in the exterior surface of ball member 60 directly opposite receptacle member 81. Bore 64 extends through body 62 obliquely relative to the longitudinal axis 65 to define an angle, α, as shown in FIG. 5. The term "obliquely" with respect to describing the orientation of bore 64 with respect to longitudinal axis 65 is intended to mean neither perpendicular nor parallel. Ball member 60 may be formed, preferably molded or cast, from any material that is rigid and durable such as metal or plastic or the like. The body 62 further defines two lateral recesses 69 located adjacent to bore 64 as shown in FIGS. 3 and 5.

A hanger bracket 110 is also provided having an upper end, or top 112, that is mounted to surface 20. Surface 20 can be any surface, including a flat ceiling, a sloped or cathedral ceiling, or a support beam. Hanger bracket 110 also has a bottom end 114 that defines a socket 115 having an opening 116 therethrough that is wider than the width of the down rod 90 and narrower than the diameter of ball member 60. The bottom 114 and top 112 are connected by a wall 111, which has reinforcing members [113] for adding additional support. Socket 115 is shaped to receive ball member 60 so that they form a ball and socket joint. Ball member 60 is received in socket 115 such that the down rod 90 extends through opening 116. The socket 115 further defines a gap 120 in the socket 115. Gap 120 is wider than the width of down rod 90 and narrower than the diameter of ball member 60 and is positioned so that down rod 90 can pass through gap 120 when mounting ball member 60 in socket 115. Additionally, channel 66 receives protruding member 117 to prevent rotational movement of ball member 60 in socket 115.

When the assembly 100 is completely assembled, it can be appreciated that down rod 90 has a range of rotational movement facilitated by the ball and socket joint formed by the ball member 60 and socket 115. This range of rotational movement is much improved by the offset bore 64 in ball member 60 and allows an object to be suspended downward even when the assembly is mounted to a sloped surface such as a sloped or cathedral ceiling having a slope of up to about fifty-one degrees.

Figure 2:
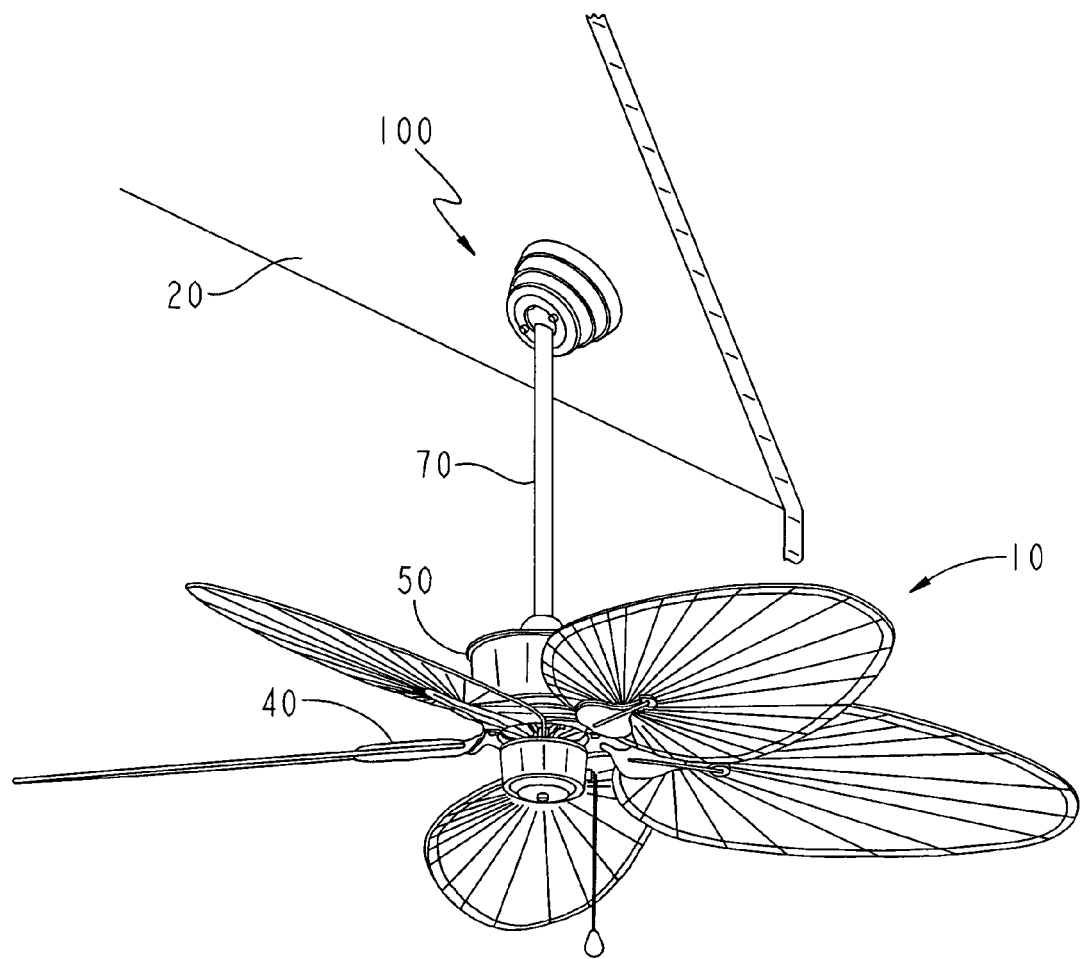
FIG. 2 is a perspective view of a ceiling fan in accordance with an embodiment of the present invention.

FIG. 2 illustrates another embodiment of the invention. In FIG. 2, assembly 100 is utilized to suspend a ceiling fan 10 from surface 20, which is a sloped ceiling. The ceiling fan comprises the assembly 100, a rotating member 40, an upper stationary member 50, and a motor (not shown). Rotating member 40, upper stationary member 50 and motor can be of any type known in the art. The rotating member 40, in turn, is connected to fan blades through means known in the art. As shown in FIG. 2, the lower end 70 of down rod 90 engages the upper stationary member 50. As in FIG. 1, it can be appreciated that the assembly 100 allows the ceiling fan 10 to be hung downward from the sloped ceiling, which has a pitch angle of up to about fifty-one degrees.

It is a further aspect of this invention to provide a method for suspending an object from a surface. The object could be any object, including a ceiling fan, light fixture, plant or piece of art. The surface 20 can be any surface including a ceiling, a sloped or cathedral ceiling, a support beam or other support structure.

Using the embodiments shown in FIGS. 1 and 3, the method consists of mounting an upper end 112 of a hanger bracket 110 to the surface wherein the hanger bracket has a bottom end 114 that defines a socket 115. A down rod 90 is then provided having an upper end 80 and a lower end 70, and having a ball member 60 connected to the upper end. The ball member has a longitudinal axis 65 and a bore 64 extending through ball member 60. Bore 64 extends through ball member 60 so that the bore's longitudinal axis is oblique relative to the longitudinal axis 65 of ball member 60. "Oblique" means neither perpendicular nor parallel. As such, longitudinal axis 65 and the longitudinal axis of the bore 64 define an angle, α. Preferably, angle α is in a range of between about twenty-five and fifty-five degrees. More preferably, angle α is in a range of between about twenty-five and thirty-five degrees.

Ball member 60 is connected to down rod 90, and in this context the term "connected" includes a ball member 60 that is a separate element that is physically attached to down rod 90 and a down rod 90 that is molded or shaped to include an integral ball member component.

Down rod 90 is then passed through gap 120 in socket 115 and into opening 116 defined by socket 115, wherein gap 120 and opening 116 are each wider than the width of down rod 90 and narrower than the diameter of ball member 60.

Ball member 60 is then lowered into socket 115 so that down rod 90 extends through opening 116. Channel 66 receives protruding member 117.

An object suspended in this manner is capable of hanging downward, even if the surface is sloped at an angle of between thirty and fifty-one degrees, because of the offset bore 64 extending through ball member 60 and because of the ball and socket joint formed by ball member 60 and socket 115. Rotational movement of ball member 60 in socket 115 is prevented since protruding member 117 is contained in channel 66. As a result, movement of ball member is limited to one plane, which adds stability to ceiling fan mountings, for example.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. An assembly for suspending an object from a sloped ceiling surface, comprising:
    a bracket having (i) a first end portion configured to be attached to said sloped ceiling surface, said first end portion defining a first opening, and (ii) a second end portion defining a socket surface, said socket surface defining a second opening;
    a retainer including (i) a generally hemispherical body having an outer surface configured to be received by said socket surface, said body defining a first longitudinal axis, and (ii) a sleeve structure having a central bore that defines a second longitudinal axis, wherein said first longitudinal axis and said second longitudinal axis define an oblique angle α, and
    a rod supported by said retainer and at least partially positioned within said sleeve structure, said rod extending through said second opening defined in said socket surface,
    wherein, when said first end portion of said bracket is attached to said sloped ceiling surface and said outer surface of said body is received by said socket surface, gravity forces said outer surface of said body into contact with said socket surface so that said retainer is maintained within said bracket.

2. The assembly of claim 1, wherein 5.0°<α<55.0°.

3. The assembly of claim 2, wherein 25.0°<α<55.00.

4. The assembly of claim 3, wherein 25.0°<α<35.00.

5. The assembly of claim 1, wherein:
    said body defines an interior space, and
    said sleeve structure is at least partially located within said interior space.

6. The assembly of claim 1, wherein said rod extends entirely through said central bore of said sleeve structure.

7. An assembly for suspending an object from a sloped surface, comprising:
    a bracket defining a socket surface;
    a retainer including (i) a generally hemispherical body having an outer surface configured to be received by said socket surface, said body defining a first longitudinal axis, and (ii) a sleeve structure having a central bore that defines a second longitudinal axis, wherein said first longitudinal axis and said second longitudinal axis define an oblique angle α,
    a rod supported by said retainer and at least partially positioned within said sleeve structure, and
    wherein said rod has defined therein a first hole,
    wherein said pin is configured to extend through said first hole, and
    wherein said retainer further includes a first receptacle structure located adjacent to said sleeve structure and configured to receive at least a portion of said pin.

8. The assembly of claim 7, wherein:
    said body includes a generally circular rim, and said first receptacle structure is spaced apart from said generally circular rim.

9. An assembly for suspending an object from a sloped surface, comprising:
    a bracket defining a socket surface;
    a retainer including (i) a generally hemispherical body having an outer surface configured to be received by said socket surface, said body defining a first longitudinal axis, and (ii) a sleeve structure having a central bore that defines a second longitudinal axis, wherein said first longitudinal axis and said second longitudinal axis define an oblique angle α,
    a rod supported by said retainer and at least partially positioned within said sleeve structure, and
    a pin
    wherein said rod has defined therein a first hole and a second hole, wherein said pin is configured to extend through both said first hole and said second hole so as to define a first lateral pin segment and a second lateral pin segment, and
    wherein said retainer further includes (i) a first receptacle structure located adjacent to said sleeve structure and configured to receive said first lateral pin segment therein, and (ii) a second receptacle structure also located adjacent to said sleeve structure and configured to receive said second lateral pin segment therein.

10. An assembly for suspending an object from a sloped surface, comprising:
    a bracket defining a socket surface;
    a retainer including (i) a generally hemispherical body having an outer surface configured to be received by said socket surface, said body defining a first longitudinal axis, and (ii) a sleeve structure having a central bore that defines a second longitudinal axis, wherein said first longitudinal axis and said second longitudinal axis define an oblique angle α, and
    a rod supported by said retainer and at least partially positioned within said sleeve structure,
    wherein said socket surface of said bracket defines an opening,
    wherein said bracket has an alignment member extending into said opening,
    wherein said outer surface of said body having defined therein a channel, and
    wherein said alignment member is located within said channel.

11. The assembly of claim 10, wherein:
    said body includes a generally circular rim, and
    said channel intersects said generally circular rim.

12. An assembly for suspending an object from a sloped ceiling surface, comprising:
    a bracket having (i) a first end portion configured to be attached to said sloped ceiling surface, said first end portion defining a first opening, and (ii) a second end portion defining a support surface, said support surface defining a second opening;

a retainer including (i) a body having a convex outer surface positioned in contact with said support surface, said body defining a first longitudinal axis, and (ii) a sleeve structure having a central bore that defines a second longitudinal axis, wherein said first longitudinal axis and said second longitudinal axis define an oblique angle α, and an elongated support at least partially positioned within said sleeve structure, said elongated support extending through said second opening defined in said support surface, wherein, when said first end portion of said bracket is attached to said sloped ceiling surface, gravity forces said convex outer surface of said body into contact with said support surface so that said retainer is maintained within said bracket.

13. The assembly of claim 12, wherein 5.0°<α<55.0°.

14. The assembly of claim 13, wherein 25.00<α<55.0°.

15. An assembly for suspending an object from a sloped surface, comprising:

a bracket defining a support surface;

a retainer including (i) a body having a convex outer surface positioned in contact with said support surface, said body defining a first longitudinal axis, and (ii) a sleeve structure having a central bore that defines a second longitudinal axis, wherein said first longitudinal axis and said second longitudinal axis define an oblique angle α, and an elongated support at least partially positioned within said sleeve structure, wherein 25.0°<α<35.00.

16. The assembly of claim 12, wherein:

said body defines an interior space, and said sleeve structure is at least partially located within said interior space.

17. The assembly of claim 12, wherein said elongated support member extends entirely through said central bore of said sleeve structure.

18. An assembly for suspending an object from a sloped surface, comprising:

a bracket defining a support surface;

a retainer including (i) a body having a convex outer surface positioned in contact with said support surface, said body defining a first longitudinal axis, and (ii) a sleeve structure having a central bore that defines a second longitudinal axis, wherein said first longitudinal axis and said second longitudinal axis define an oblique angle α, an elongated support at least partially positioned within said sleeve structure; and pin:

wherein said elongated support has defined therein a first hole, wherein said pin is configured to extend through said first hole, and wherein said retainer further includes a first receptacle structure located adjacent to said sleeve structure and configured to receive at least a portion of said pin.

19. The assembly of claim 18, wherein:

said body includes a generally circular rim, and said first receptacle structure is spaced apart from said generally circular rim.

20. An assembly for suspending an object from a sloped surface, comprising:

a bracket defining a support surface;

a retainer including (i) a body having a convex outer surface positioned in contact with said support surface, said body defining a first longitudinal axis, and (ii) a sleeve structure having a central bore that defines a second longitudinal axis, wherein said first longitudinal axis and said second longitudinal axis define an oblique angle α, an elongated support at least partially positioned within said sleeve structure; and a pin, wherein said elongated support has defined therein a first hole and a second hole, wherein said pin is configured to extend through both said first hole and said second hole so as to define a first lateral pin segment and a second lateral pin segment, and wherein said retainer further includes (i) a first receptacle structure located adjacent to said sleeve structure and configured to receive said first lateral pin segment therein, and (ii) a second receptacle structure also located adjacent to said sleeve structure and configured to receive said second lateral pin segment therein.

21. An assembly for suspending an object from a sloped surface, comprising:

a bracket defining a support surface;

a retainer including (i) a body having a convex outer surface positioned in contact with said support surface, said body defining a first longitudinal axis, and (ii) a sleeve structure having a central bore that defines a second longitudinal axis, wherein said first longitudinal axis and said second longitudinal axis define an oblique angle α, and an elongated support at least partially positioned within said sleeve structure, wherein said support surface of said bracket defines an opening, wherein said bracket has an alignment member extending into said opening, wherein said outer surface of said body having defined therein a channel, and wherein said alignment member is located within said channel.

22. The assembly of claim 21, wherein:

said body includes a generally circular rim, and said channel intersects said generally circular rim.

23. The assembly of claim 12, wherein said body possesses a generally hemispherical shape.

24. An assembly for suspending an object from a sloped ceiling surface, comprising:

a bracket having (i) a first end portion configured to be attached to said sloped ceiling surface, said first end portion defining a first opening, and (ii) a second end portion defining a support surface, said support surface defining a second opening;

a retainer including a generally cup-shaped body having an outer surface positioned in contact with said support surface; and an elongated support attached to said retainer, said elongated support extending through said second opening defined in said support surface, wherein said body defines a first longitudinal axis, wherein said body further defines a bore for receiving said elongated support within an interior space of said body, wherein said bore defines a second longitudinal axis;

wherein said elongated support extends through said bore, wherein said first longitudinal axis and said second longitudinal axis define an oblique angle α, and wherein, when said first end portion of said bracket is attached to said sloped ceiling surface, gravity forces said outer surface of said body into contact with said support surface so that said retainer is maintained within said bracket.

25. The assembly of claim 24, wherein $5.0°<α<55.0°$.

26. An assembly for suspending an object from a sloped surface, comprising:
a bracket defining a support surface;
a retainer including a generally cup-shaped body having an outer surface positioned in contact with said support surface; and
an elongated support attached to said retainer,
wherein said body defines a first longitudinal axis,
wherein said body further defines a bore for receiving said elongated support within an interior space of said body,
wherein said bore defines a second longitudinal axis,
wherein said elongated support extends through said bore, and
wherein said first longitudinal axis and said second longitudinal axis define an oblique angle α,
wherein $25.0°<α<35.0°$.

27. An assembly for suspending an object from a sloped surface, comprising:
a bracket defining a support surface;
a retainer including a generally cup-shaped body having an outer surface positioned in contact with said support surface; and
an elongated support attached to said retainer,
wherein said body defines a first longitudinal axis,
wherein said body further defines a bore for receiving said elongated support within an interior space of said body,
wherein said bore defines a second longitudinal axis,
wherein said elongated support extends through said bore, and
wherein said first longitudinal axis and said second longitudinal axis define an oblique angle α,
further comprising a pin,
wherein said elongated support has defined therein a first hole and a second hole,
wherein said pin is configured to extend through both said first hole and said second hole so as to define a first lateral pin segment and a second lateral pin segment, and
wherein said retainer further includes (i) a first receptacle structure located adjacent to said bore and configured to receive said first lateral pin segment therein, and (ii) a second receptacle structure also located adjacent to said bore and configured to receive said second lateral pin segment therein.

28. An assembly for suspending an object from a sloped surface, comprising:
a bracket defining a support surface;
a retainer including a generally cup-shaped body having an outer surface positioned in contact with said support surface; and
an elongated support attached to said retainer,
wherein said body defines a first longitudinal axis,
wherein said body further defines a bore for receiving said elongated support within an interior space of said body,
wherein said bore defines a second longitudinal axis,
wherein said elongated support extends through said bore, and
wherein said first longitudinal axis and said second longitudinal axis define an oblique angle α,
wherein said support surface of said bracket defines an opening,
wherein said bracket has an alignment member extending into said opening,
wherein said outer surface of said body having defined therein a channel, and
wherein said alignment member is located within said channel.

29. The assembly of claim 28, wherein:
said body includes a generally circular rim, and
said channel intersects said generally circular rim.

30. The assembly of claim 24, wherein said body possesses a generally hemispherical shape.

* * * * *